July 1, 1947.　　　E. P. BULLARD, 3D., ET AL　　　2,423,223
MACHINE TOOL
Filed Dec. 27, 1944　　　2 Sheets-Sheet 2
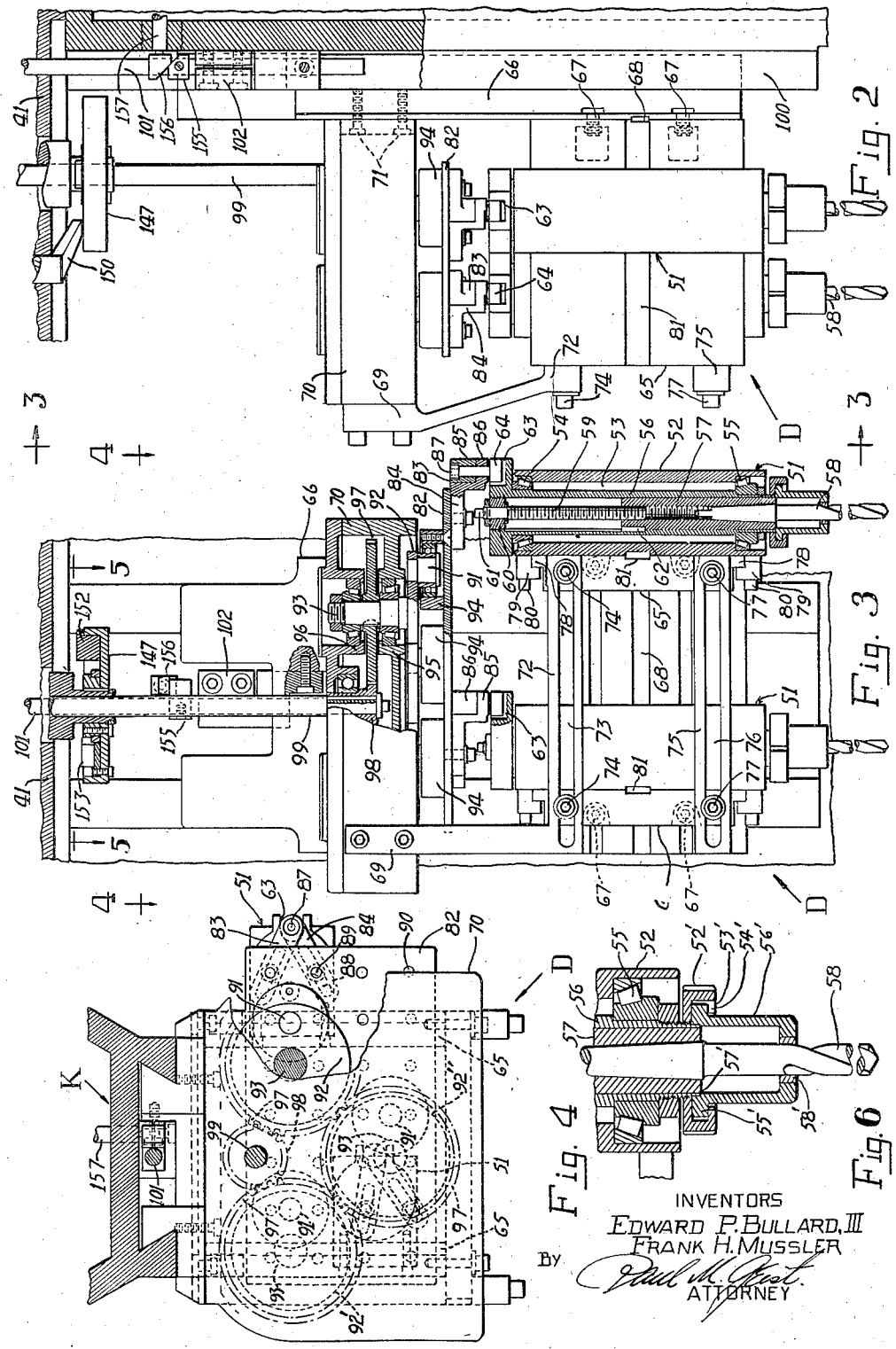
INVENTORS
EDWARD P. BULLARD, III
FRANK H. MUSSLER
By 
ATTORNEY Patented July 1, 1947

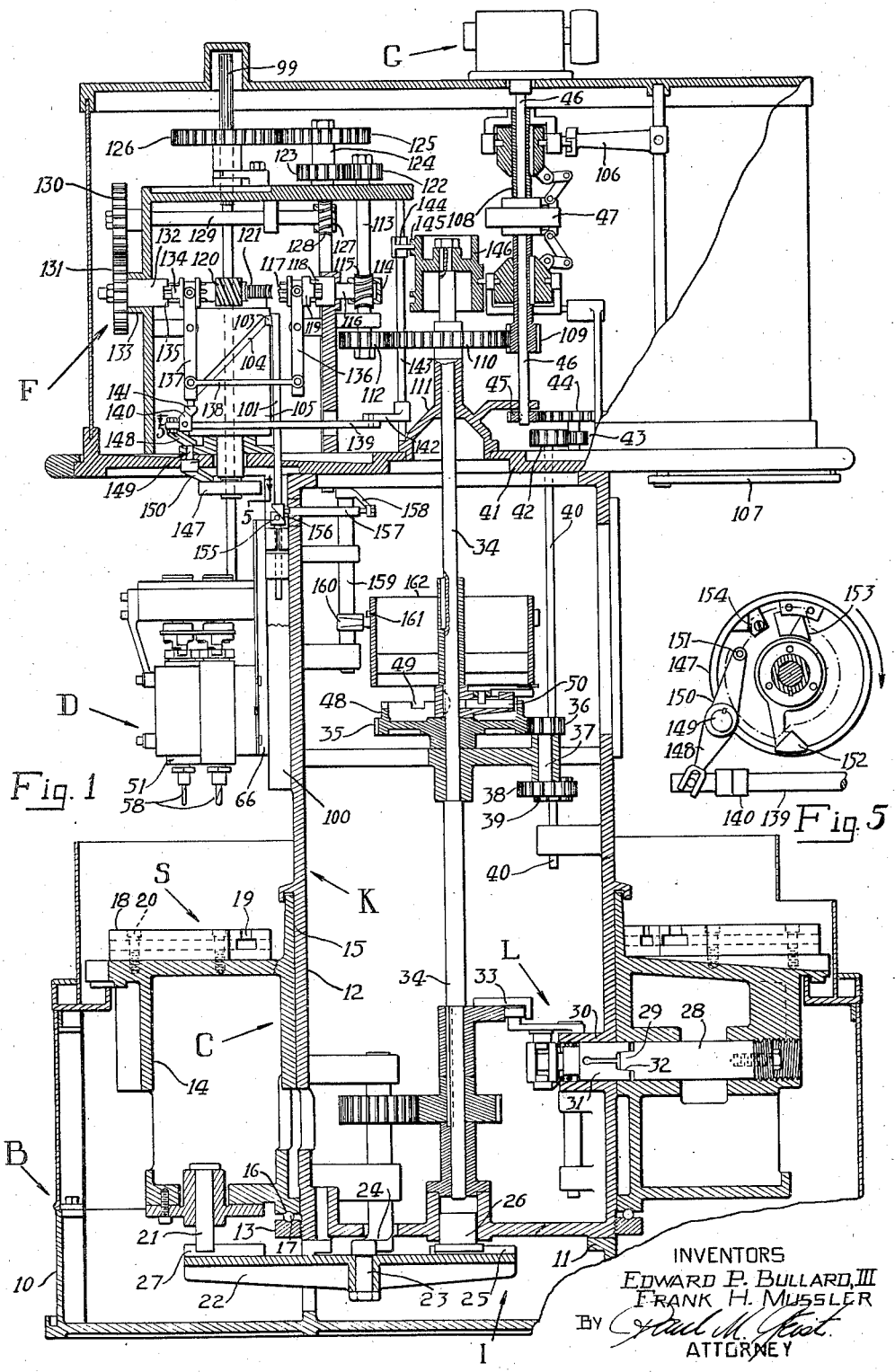

2,423,223

UNITED STATES PATENT OFFICE 2,423,223

MACHINE TOOL

Edward P. Bullard, III, Fairfield, and Frank H. Mussler, Stratford, Conn., assignors to The Bullard Company, a corporation of Connecticut Application December 27, 1944, Serial No. 570,010

15 Claims. (Cl. 77—24)

This invention relates to machine tools, and particularly to a new and improved drilling, reaming, tapping and/or boring machine.

Objects of the invention include the provision of a multiple-station machine tool at each working station of which a relatively large number of operations can be performed simultaneously, each involving the use of a rotating spindle that can be readily pre-set at any point within the area of its station; the provision of such a multiple-station machine tool in which the work is indexed from station to station upon the completion of the operation requiring the greatest length of time; the provision of such a machine tool in which each spindle is axially adjustable relatively to each other; the provision of such a machine tool wherein all spindles at each station are simultaneously rotated by a common drive plate that is adapted to be connected to each of its respective spindles regardless of their location and to impart thereto a true rotary motion; and the provision of a single station drilling machine embodying any and/or all of the above-mentioned features applicable thereto.

Heretofore, accurate drilling required a jig for locating and guiding the drill during an operation. Jigs are usable for only a single setup and are exceedingly expensive and time-consuming to make. The use of jigs involves the cooperation between a stationary guide bushing in each hole of the jig and the point end of the rotating drill. With repeated use, these bushings wear, permitting the drill to form an inaccurate hole due to a walking action of the drill. Another object of this invention, therefore, is to provide means for accurately drilling holes in work without the use of jigs or even center-punch marks, and which will eliminate the above as well as other difficulties attending the use of jigs.

The above, as well as other objects and novel features of the invention will become apparent from the following specification and accompanying drawings, in which:

Figure 1 is a front sectional-elevational view of a machine tool to which the principles of the invention have been applied;

Figure 2 is an enlarged view of a portion of the apparatus shown in Figure 1, parts being broken away to show others;

Figure 3 is a front elevational view, partly in section, looking in the direction of the arrows along line 3—3 of Figure 2;

Figure 4 is a plan view, with parts broken away to show others, as viewed along line 4—4 of Figure 3;

Figure 5 is a plan view showing the timing mechanism as viewed along line 5—5 of Figures 1 and 3; and Figure 6 is an enlarged elevational view of a portion of the apparatus shown in Figure 3.

Referring to Figure 1, the invention is shown as applied to a multiple station machine tool including a base B to which is attached a column K. The lower portion of the column K journals an annular-shaped carrier C to which non-rotatable work supports S are attached in equally-spaced relation thereabout. The carrier C is adapted to be indexed from station to station about the column K by indexing mechanism I, and to be accurately located and rigidly held in each index position by binding and locking mechanism L. The outer periphery of the column K is polygonal and includes a drilling attachment D at each station except one, which is employed as a loading station. The drilling attachment D is adapted to include simultaneously driven spindles that are independently adjustable to any point within the entire area of the supports S. The attachment D is adapted to be moved downwardly toward the work supports S at a relatively rapid traverse and relatively slow feed rates, and to be moved upwardly away from the work supports S at a rapid traverse rate by the action of a feedworks transmission F. There is a feedworks transmission F for each attachment D and they receive power from any form of prime mover which in the particular instance is a gear box G that is supplied with power from a motor remote from the apparatus.

The base B includes a substantially cylindrical member 10 having a centrally located up-standing hub 11 to which the column K is attached. The base 10 serves as the lower portion of a lubricating chamber and is cored to receive the various working parts of the apparatus. The column K comprises a general cylindrical member 12, to the lower end of which is threaded an anti-friction bearing race 13.

The carrier C includes an annular-shaped member 14 that is provided with a journal bearing 15 which cooperates with the lower end of the column K. The lower surface of the carrier C is provided with an anti-friction bearing race 16 between which and the race 13 of column K, ball bearings 17 are located. The carrier C is provided with work supports S equally spaced about it. They include substantially rectangular tables 18 having the usual T-slots 19 therein for receiving T-bolts employed to rigidly attach a locating member or vise for properly holding the work during a drilling operation. The supports S are rigidly bolted to carrier C by screws 20, and a pin 21 is located beneath each work support for facilitating the indexing of the carrier and work supports from station to station.

The indexing mechanism I comprises an arm 22 that is journaled on a pin 23 of a crank 24. The one end of arm 22 is provided with a slide bearing 25 that cooperates with a pivot 26 rigidly located at the center of the column K. The end of the arm 22 opposite that containing slide bearing 25 includes a slotted portion 27 that is adapted to cooperate with the lower end of each of the pins 21 in such manner that the carrier C and the work supports S are successively moved from station to station about the column K. The locking mechanism L comprises a plug 28 having its inner portion provided with a tongue 29. The column K is provided with a cylinder 30 within which a plunger 31 is adapted to be reciprocated. The plunger 31 is provided with a bifurcated end 32 that cooperates with the tongue 29 of the plug 28. Plunger 31 is adapted to be moved into and out of cooperating relation relatively to the plug 28 by the action of a cam 33 all as more fully shown and described in Patent No. 1,360,175 to E. P. Bullard. The crank 24 and the cam 33 are adapted to be rotated in timed relation relatively to each other so that the plunger 31 is moved inwardly away from the plug 28 before the arm 22 engages a pin 21, and, upon the completion of a revolution of the crank 24, the cam 33 causes the plunger 31 to move radially outwardly into cooperating position with the plug 28. These functions are adapted to occur upon a single revolution of a vertically-disposed shaft 34 located along the central axis of the column K. Therefore, each time that it is desired to index the carrier C from one station to another, it is necessary to impart a single revolution to the shaft 34. This is accomplished through the engagement between shaft 34 and a continuously rotatable gear 35 that meshes with a pinion 36 fixed to a stud shaft 37. The shaft 37 also rigidly supports a pinion 38 that meshes with a spur gear 39 keyed to a vertically-disposed shaft 40. The shaft 40 extends upwardly through a plate 41 at the top of the column K and to the upper end of which a gear 42 is keyed. The gear 42 meshes with a pinion 43 forming one of a cluster including a gear 44 that meshes with a pinion 45 keyed to a vertically-disposed shaft 46. The shaft 46 extends upwardly through a clutch 47 and into the gear box G which continuously rotates it so long as power is supplied to the box G.

The gear 35 includes an up-standing flange portion 48 that is provided with a plurality of peripherally-arranged slots 49 within which a plunger 50 is adapted to be inserted by mechanism shown in Figures 7 and 8, and described in the specification of Patent No. 2,259,948, granted to E. P. Bullard, III.

Each of the drilling attachments D includes a plurality of heads 51 that are adapted to be mounted for independent adjustment to any location within the extent of its work support S. Referring to Figure 3, each of the heads 51 includes a rectangular housing or frame member 52 having a centrally-bored opening 53 extending therethrough. Anti-friction bearings 54 and 55 are located at each end of the bore 53 for journaling a sleeve or tubular spindle 56. The spindle 56 supports a reciprocable collet 57 that is adapted to hold a drill 58, or other rotatable metal working tool. The collet 57 is internally threaded onto a screw 59 mounted for rotation, but fixed against axial movement within a block 60 fixed to the upper end of the sleeve or spindle 56. The upper end of the screw 59 is formed with a square head 61 so that a wrench may be attached to it for rotating it, thereby causing the collet 57 to move vertically relatively to the sleeve or spindle 56. The collet 57 is prevented from turning when the screw 59 is turned by a spline 62. The upper end of the spindle 56 adjacent the plug 60 is flanged and includes a slot 63 providing a lost motion driving connection with a roll 64 for a purpose to be described later.

One portion of the apparatus for attaining the result of accurately drilling holes without the use of a jig includes a guide bearing adapted rigidly to support the working portion of the drill near its point end. Referring to Figures 2, 3 and 6, and particularly Figure 6, the lower end of sleeve 56 is threaded to receive the race for anti-friction bearing 55. A nut 52' is threaded to sleeve 56 beneath bearing 55 and includes a flange 53' having diametrically-opposed slots 54' for receiving diametrically-opposed ears 55' on an elongated cup-shaped guide 56'. The ears 55' pass through slots 54' and rest on the upper surface of flange 53'. Tightening nut 52' forces a shoulder 57' of guide 56' against the lower end of sleeve 56, thereby rigidly attaching the two so that they rotate in unison. The lower end of guide 56' is provided with a bushing 58' that snugly fits the work portion of drill 58 at a point substantially below its shank and near its working end. Rotation of the square end 61 of screw 59 provides relative axial movement between the guide 56' and drill 58 so that the amount of unsupported length of drill 58 need only be slightly greater than the length of hole to be drilled. This permits the accurate drilling of holes without the use of a jig or even a center-punch mark because the working end of the drill is always rigidly guided by guide 56'. Furthermore, since there is no relative rotation between the bushing 58' and drill 58, no inaccuracies due to wearing of the parts occur.

The heads 51 are adapted to be mounted on a frame in such manner that they can be moved in two directions at right angles to each other. Consequently, the heads 51 can be adjusted to any position within a plane containing the surface to be drilled. This, in addition to the guiding means above described, permits the accurate drilling of work without the use of a jig. The frame to which the heads 51 are connected comprises a plurality of slidable members 65, only two of which are shown in the present embodiment. The members 65 are attached to a saddle 66 by bolts 67 that cooperate with T-slots formed in the outer face of the saddle 66. A key 68 that cooperates with keyways formed between the members or slides 65 and the saddle 66 assists in maintaining these members 65 in accurate position. A bracket 69 is rigidly attached to a housing 70 that is fixed to the saddle 66 through bolts 71 (Fig. 2). The bracket 69 includes an arm 72 having an elongated slot 73 therein through which bolts 74 extend for adjustably attaching members 65 to said arm. An additional bracket 75, having an elongated slot 76 therein, extends between the lower ends of the members 65 and is adjustably fixed to said members by screws 77 forming a rigid box-like structure including saddle 66, members 65, arm 72 and bracket 75.

The members 65 include flanges 78 about which clamp members 79 extend. The members 79 are rigidly attached to the housing 52 of the heads 51 by bolts 80. A keyway 81 formed between the one face of the housing 52 and the one face of the members 65 includes a key for assisting the accurate and rigid location of the housing 52. From the foregoing, it is evident that movement of the housings 52 along the flanges 78 can be effected by loosening the bolts 80; and that the members 65 can be moved along the keyways 68 by loosening the bolts 74, 77 and 67. Accordingly, the drill heads 51 can be independently adjusted to any location within the area of the work support S.

All of the drills 58 of the various heads 51 at each station are adapted to be rotated simultaneously regardless of their location within the extent of said station. This is accomplished in the present invention by providing a driving member or plate 82 that is adapted to be driven eccentrically. Accordingly, each of the heads 51 at any station is adapted to be attached to the eccentrically-driven plate 82 by a crank member having the exact eccentricity of that of the plate 82. Referring to Figures 3 and 4, this crank member comprises a pair of levers 83 and 84 having bosses 85 and 86, respectively. Aligned openings extend through these bosses for receiving a stud 87 on which the roll 64 is mounted. Each of the levers 83 and 84 is provided with a slot 88 through which locking bolts 89 are adapted to extend. The plate 82 includes a plurality of drilled holes 90 so arranged thereon that cooperation between them, the bolts 89 and the slot 88 of the levers 83, 84 makes it possible to locate the roll 64 at any point within the area of the work support S. Accordingly, it is only necessary to adjust the heads 51 to the desired positions within the area of the work support S and to attach one of the cranks including the levers 83 and 84 to the plate 82 so that the roll 64 rests within the slot 63 in the flange of the spindle 56. The slot 63 is open ended, permitting a slight lost-motion driving connection between plate 82 and the sleeve 56.

The driving member or plate 82 is adapted to be driven eccentrically by three crank pins 91, one attached to each of three discs 92, 92' and 92" by an anti-friction bearing mounted in a boss 94 on each of said discs. Each disc is provided with an integral stud 93 journaled in anti-friction bearings mounted in bosses 95, 96 within housing 70. A gear 97 is keyed to stud 93 between the bosses 95 and 96 and meshes with a gear 98 keyed to a vertically-disposed driving shaft 99. The gear 97 for the disc 92 not only meshes with the gear 98, but also with an identical gear 97 for the disc 92" (Fig. 4). Likewise, another identical gear 97 for the disc 92' meshes with the driving gear 98 and also with the gear 97 for the disc 92". This construction maintains a fixed angular relation between the discs 92, 92' and 92" and, therefore, provides an equally distributed uniform drive for plate 82 from drive shaft 99.

Referring to Figure 1, the head D is adapted to be moved toward and from the supports S by the feedworks F. The saddle 66 to which the attachment D is fixed, is adapted to be slidably mounted on bearings 100 fixed to the side of the column K. Referring to Figure 2, a feed rod 101 is adjustably secured to the saddle 66 through a clamp member 102. The feed rod 101 (Fig. 1) extends upwardly through the plate 41 at the top of the column K and at its upper extremity is provided with a cam roll 103 that rides in a cam groove 104 on the periphery of a feed drum 105.

The drum 105 is adapted to be rotated at a relatively rapid rate for causing the feed rod 101 to be moved downwardly and upwardly during traverse movement, and at a plurality of relatively slow rates of speed during the downward feeding movement of the attachment D.

Since, as previously mentioned, the shaft 46 continuously rotates when power is applied to the gear box G, engagement of the clutch 47 by the oscillatable movement of an arm 106 by a crank arm 107 causes the rotation of a sleeve 108. A spur gear 109 on sleeve 108 meshes with a gear 110 journaled on a boss 111 located centrally of the column K through which the upper end of the shaft 34 extends. The gear 110 meshes with a pinion 112 fixed to the lower end of a vertically-disposed shaft 113. A worm gear 114 fixed to the shaft 113 meshes with a worm 115 that is keyed to the one end of a horizontally-disposed sleeve 116. The sleeve 116 is journaled on the end of a shaft 117 and includes a clutch portion 118 adapted to be engaged by a movable clutch portion 119 splined to the shaft 117. The shaft 117 also includes a worm 120 that meshes with a worm wheel 121 integral with the upper end of the drum 105. Accordingly, when the clutch elements 119 and 118 are in engagement, the drum 105 is adapted to be rotated at a relatively rapid speed. The vertically-disposed shaft 113 is provided with a pull gear 122 at its upper end that meshes with a spur gear 123 fixed to stub shaft 124. A gear 125 is fixed to the upper end of the stub shaft 124 and it meshes with a gear 126 splined to the upper end of shaft 99 that extends downwardly through the center of the feed drum 105. The shaft 124 also includes a worm 127 that meshes with a worm wheel 128 fixed to a horizontally-disposed shaft 129. The end of shaft 129 opposite that supporting worm gear 128 includes a pull gear 130 in mesh with a mating pull gear 131 keyed to a sleeve 132. The sleeve 132 is journaled within a bracket 133 and provides a support for the end of shaft 117 opposite that journaled in the sleeve 116. This latter end of shaft 117 is provided with a movable clutch element 134 splined to it and adapted to cooperate with a clutch element 135 integral with the sleeve 132. Movement of the clutch 134 into engagement with the clutch 135 causes the worm 120 to rotate relatively slowly through the train of gears 110, 112, 122, 123, 127, 128, 130 and 131. For obvious reasons, the movable clutch elements 119 and 134 may not be engaged with their respective mating clutch elements 118 and 135 simultaneously. The clutch element 119 is provided with a depending lever 136 and the element 134 is provided with a similar lever 137. These levers are pivoted midway between their ends and are joined together by a bar 138. The construction and arrangement of the parts are such that movement of the bar 138 rightwardly, as viewed in Figure 1, will cause engagement of clutch 134 with clutch 135 and disengagement of clutch 119 from clutch 118; and movement of said bar 138 leftwardly, as viewed in Figure 1, will cause engagement of clutch elements 119 and 118 and disengagement of clutches 134 and 135.

Movement of the bar 138 is caused by corresponding movement of a rod 139 that includes an actuator 140 adapted to cooperate with a spring-pressed arrow head 141 located at the lower end of the lever 137. With the parts in the position shown in Figure 1, the arrow head 141 is on the right-hand side of the actuator 140 and tends to urge the clutch 134 into engagement with a clutch 135. However, this does not occur because the clutches 134 and 119 are held in neutral by a cam on the back of the feed drum 105 (not shown) and which is effective at the end of each cycle of operation of the cam drum 105.

The rod 139 is connected to a lever 142 fixed to a vertically-disposed shaft 143. The upper end of the shaft 143 rigidly supports a finger 144 that is adapted to be engaged by a dog 145 on a control drum 146 fixed to the top of shaft 34. There are as many dogs 145 on the drum 146 as there are feedworks F about the column K. Each of these dogs 145 is at a different elevation with respect to every other one and each cooperates with a finger 144 for its corresponding feedworks. From the foregoing, it is evident that upon the completion of an indexing operation of the carrier C through the single rotation of the shaft 34, the drum 146 also makes a single revolution and finger 144 is oscillated at the completion of the single revolution of the shaft 34. Oscillation of the finger 144 actuates the rod 139 at each work station to move the actuator 140 to the right-hand side of the spring-pressed arrow head 141, thereby causing the clutch 119 to engage the clutch 118 and the rapid rotation of the drum 105. Referring to Figure 5, the feed drum is provided with a timing disc 147 that rotates with it in the direction of the arrow. An arm 148 that cooperates with the rod 139 is connected to a shaft 149 extending downwardly through the plate 41 and to the lower end of which is provided an arm 150. The arm 150 includes a cam follower 151 that is located within the extent of the timing disc 147. With the parts in the position shown in Figure 1, namely, with the clutches 119 and 134 in neutral, the follower 151 is located in the solid line position (Fig. 5). Upon the completion of an indexing movement of the carrier C, the drum 105 and the timing disc begin to rotate at a relatively rapid rate in the direction of the arrow (Fig. 5) and the follower 151 moves radially outwardly to the dot and dash line position. During the rotation of the timing disc 147, a cam 152 engages the follower 151 forcing it inwardly sufficiently to cause the rod 139 to move leftwardly so that the actuator 140 is located on the left side of the arrow head 141, thereby causing clutch 134 to engage clutch 135 and the continued movement of the attachment D downwardly at a relatively slow feed rate. This feeding rate continues during the drilling operation on the work until a cam 153 on the timing disc 147 engages the follower 151 forcing it outwardly, thereby positioning the actuator 140 on the right side of the arrow head 141, thereby causing the rapid rotation of the drum 105. This last-mentioned action occurs when the follower 103 on the feed rod 101 is at the lowest point in the cam 104. Consequently, the feed rod 101 and the attachment D are raised at a relatively rapid rate until another cam 154 moves the follower 151 inwardly to position the actuator 140 in the position shown in Figure 1, tending to move the clutch 134 into engagement with the clutch element 135. However, this does not occur because a neutralizing cam on the drum 105 prevents this action at the end of the cycle of operation. The cams 152 and 153 are adjustable so as to vary the extent of the downward traverse and downward feed of the attachment D. By changing the pull gears 122, 123, 125, 126, 130 and 131, it is evident that different rates of feed of the attachment D can be accomplished, as well as different rates of rotation of the drills 58.

Since the cam groove 104 includes a fixed lower limit, the head D can move only to a lower position dictated by the initial setting of the connection 102 (Fig. 2) between saddle 66 and feed rod 101. However, since each frame member includes an individually axially adjustable means 59 (Fig. 3), the respective spindles in each bracket D can be pre-set for drilling to any predetermined depth by the action of the cam groove 104 and follower 103.

Each of the feed rods 101 of the various feedworks F is provided with a dog 155 that cooperates with a cam 156 on the end of a horizontally-disposed rod 157. The end of rod 157 opposite that containing the cam 156 is connected to a lever 158 fixed to a vertically-disposed shaft 159. The lower end of the shaft 159 includes a finger 160 that is adapted to abut against a dog 161 on a drum 162. Each feedworks includes a construction similar to the one just described and a separate dog 161 on the drum 162. The construction and arrangement of the parts are such that upon the completion of a cycle of operation of each attachment D at the various stations about the column K and at the end of its upward movement, the dog 155 operates the cam 156 to remove the finger 160 from engagement with its corresponding dog 161 on the drum 162. So long as any of the fingers 160 are in engagement with its corresponding dog 161 on drum 162, engagement between the plunger 50 and slots 49 is prevented. However, upon the release of all fingers 160, plunger 50 is adapted to pass within the slots 49 and effect the single rotation of the shaft 34 to cause the indexing of the carrier C as more fully described in Patent No. 2,259,948. Upon the completion of this indexing operation, as previously described, a cycle of operation of each of the feedworks F is initiated.

Although the various features of the new and improved machine tool have been shown and described in detail to fully disclose one embodiment of the invention, it will be evident that numerous changes may be made in such details without departing from the principles of the invention.

What is claimed is:

1. In a multiple-station machine tool, a bracket at each of a plurality of said stations; means on each bracket for supporting a plurality of rotatable spindles, said means comprising universally-adjustable means whereby each spindle at each station may be individually adjusted to any point within the extent of its station; a single driving plate at each station for rotating all of the spindles at said station; and adjustable connectors between said plate and each of said spindles.

2. In a multiple-station machine tool, a bracket located at one of said stations; a plurality of slides attached to said bracket for uni-lateral movement; a plurality of frame members, each adapted to be attached to said slides for movement at right angles to said uni-lateral movement; a rotatable spindle in each of said frame members; a single driving plate for rotating all of said spindles; and adjustable connectors between said plate and each of said spindles.

3. In a multiple-station machine tool, a bracket at each of a plurality of said stations; a plurality of frame members adjustably attached to said brackets; an axially-fixed sleeve journaled in each frame member for free rotation; an axially-movable collet splined to the interior of each of said sleeves for supporting a spindle; means for axially adjusting each collet within its sleeve; a single driving plate at each station for rotating the sleeves in each of the frame members at said station; and adjustable connectors between said plate and each of said sleeves.

4. A spindle head for a machine tool comprising in combination, a frame member adapted adjustably to be mounted on a supporting member; a sleeve journaled in said frame member; a collet mounted within said sleeve and splined to the inner surface thereof; an axially-fixed rotatable screw within said sleeve threaded to said collet for axially moving said collet within said sleeve; and means for rotating said sleeve.

5. In a machine tool, a bracket; means for reciprocating said bracket; a plurality of slides attached to said bracket for uni-lateral movement; a plurality of frame members, each adapted to be attached to said slides for movement at right angles to said uni-lateral movement; a sleeve journaled in each of said frame members; a collet located in each sleeve and splined to the inner surface thereof; means for axially moving the collet within each sleeve; a single driving plate for rotating all of said sleeves; and adjustable connectors between said plate and each of said sleeves.

6. Apparatus for drilling holes without the aid of a jig or center-punch mark comprising in combination, a frame member; a rotatable element within said frame member; means for rotating said element; a drill having a shank portion adapted to be rigidly held by, and rotatable with said element; guide means attached to said element for rotation therewith and providing a non-resilient bearing for the working part of said drill; and means providing relative axial movement between said drill and guide means, whereby said bearing may rigidly support the working part of said drill near its point.

7. In a multiple-station machine tool, a bracket at each of a plurality of said stations; a plurality of frame members adjustably attached to said brackets; a rotatable element within each frame member; a single driving plate at each station for rotating all of said elements at said station; adjustable connectors between said plate and each of said elements; means associated with each element adapted to rigidly support the shank portion of a drill for rotation therewith; and guide means attached to each rotatable element for rotation therewith and adapted to provide a non-resilient bearing for the working part of a drill.

8. In a multiple-station machine tool, a bracket at each of a plurality of said stations; a plurality of slides attached to said brackets for uni-lateral movement; a plurality of frame members for each bracket, each adapted to be attached to said slides for movement at right angles to said uni-lateral movement; a rotatable element within each frame member; a single driving plate at each station for rotating all of said elements at said station; adjustable connectors between said plate and each of said elements; means associated with each element adapted to rigidly support the shank portion of a drill for rotation therewith; and guide means attached to each rotatable element for rotation therewith and adapted to provide a non-resilient bearing for the working part of a drill.

9. In a machine tool, a bracket; means for reciprocating said bracket; a plurality of slides attached to said bracket for uni-lateral movement; a plurality of frame members, each adapted to be attached to said slides for movement at right angles to said uni-lateral movement; a rotatable element within each frame member; a single driving plate for rotating all of said elements; adjustable connectors between said plate and each of said elements; means associated with each element adapted to rigidly support the shank portion of a drill for rotation therewith; and non-resilient guide means attached to each rotatable element for rotation therewith and adapted to provide a bearing for the working part of a drill.

10. In a multiple-station machine tool, a bracket at each of a plurality of said stations; means on each bracket for supporting a plurality of rotatable spindles, said means comprising universally-adjustable means whereby each spindle at each station may be individually adjusted to any point within the extent of its station; means associated with each bracket comprising a driving plate that is eccentrically driven so that each point thereon moves in a circle; and adjustable crank means adapted to connect each spindle of each bracket to its corresponding driving plate.

11. In a machine tool, a bracket; means for reciprocating said bracket; a plurality of slides attached to said bracket for uni-lateral movement; a plurality of frame members, each adapted to be attached to said slides for movement at right angles to said uni-lateral movement; a rotatable spindle in each of said frame members; means associated with said bracket comprising a driving plate that is eccentrically driven so that each point thereon moves in a circle; and adjustable crank means adapted to connect each spindle to said driving plate.

12. A spindle head for a machine tool comprising in combination, a frame member adapted adjustably to be mounted on a supporting member; a sleeve journaled in said frame member; a collet mounted within said sleeve and splined to the inner surface thereof; means for axially moving said collet within said sleeve; a driving plate that is adapted to be driven eccentrically so that each point therein moves in a circle; and adjustable crank means adapted to connect said spindle to said driving plate.

13. Apparatus comprising in combination, a bracket; a plate associated with said bracket; means for eccentrically driving said plate so that each point thereon moves in a circle; a frame member adapted adjustably to be supported on said bracket; a rotatable element within said frame member; adjustable crank means for connecting said rotatable element to said plate; a drill having a shank portion adapted to be rigidly held by, and rotatable with said element; guide means attached to said element for rotation therewith and providing a bearing for the working part of said drill; and means providing relative axial movement between said drill and guide means, whereby said bearing may rigidly support the working part of said drill near its point.

14. In a multiple-station machine tool, a bracket at each of a plurality of said stations; a plurality of slides attached to said brackets for uni-lateral movement; a plurality of frame members for each bracket, each adapted to be attached to said slides for movement at right angles to said uni-lateral movement; a rotatable spindle within each frame member; means associated with each bracket comprising a driving plate that is eccentrically driven so that each point thereon moves in a circle; adjustable crank means adapted to connect each spindle of each bracket to its corresponding driving plate; means associated with each spindle adapted rigidly to support the shank portion of a drill for rotation therewith; guide means attached to each rotatable spindle for rotation therewith and adapted to provide a bearing for the working part of a drill; and means for providing relative axial movement between said spindle and guide means.

15. Apparatus comprising in combination, a plate; crank means for imparting an eccentric motion to said plate so that each point on it moves in a circle; an adjustable frame member adapted to be moved to any point within the capacity of said plate; a rotatable element within said frame member including a crank arm; and means adapted to be attached to said plate, including a lost motion driving connection with said crank arm.

EDWARD P. BULLARD, III.
FRANK H. MUSSLER.

REFERENCES CITED

The following references are of record in the file of this patent:

UNITED STATES PATENTS

| Number | Name | Date |
|---|---|---|
| 1,452,921 | McLellan | Apr. 24, 1923 |
| Re. 20,068 | Herzberg, et al. | Aug. 18, 1936 |
| 2,114,284 | Barnes, et al. | Apr. 19, 1938 |
| 1,948,507 | Carlson | Feb. 27, 1934 |
| 855,841 | Dosch | June 4, 1907 |
| 2,353,514 | Slater | July 11, 1944 |